(12) United States Patent
Kang et al.

(10) Patent No.: US 12,216,193 B2
(45) Date of Patent: Feb. 4, 2025

(54) APPARATUS AND METHOD FOR DETECTING TARGET USING RADAR

(71) Applicant: SMART RADAR SYSTEM, INC., Seongnam-si (KR)

(72) Inventors: Myung Ku Kang, Gunpo-si (KR); Jae Yong Lee, Anyang-si (KR)

(73) Assignee: SMART RADAR SYSTEM, INC., Seongnam-si (KR)

( * ) Notice: Subject to any disclaimer, the term of this patent is extended or adjusted under 35 U.S.C. 154(b) by 271 days.

(21) Appl. No.: 17/576,919

(22) Filed: Jan. 15, 2022

(65) Prior Publication Data

US 2023/0021256 A1 Jan. 19, 2023

(30) Foreign Application Priority Data

Jul. 14, 2021 (KR) .......................... 10-2021-0092279

(51) Int. Cl.
*G01S 13/58* (2006.01)
*G01S 7/35* (2006.01)

(52) U.S. Cl.
CPC ............ *G01S 13/589* (2013.01); *G01S 7/356* (2021.05); *G01S 13/584* (2013.01)

(58) Field of Classification Search
CPC ....... G01S 13/589; G01S 7/356; G01S 13/584
See application file for complete search history.

(56) References Cited

U.S. PATENT DOCUMENTS

| | | | |
|---|---|---|---|
| 11,536,822 B2 | 12/2022 | Hiramoto | |
| 11,940,557 B2 | 3/2024 | Liu et al. | |
| 12,050,259 B2 | 7/2024 | Gosala et al. | |
| 2016/0103214 A1* | 4/2016 | Clark | G01S 13/723 342/59 |
| 2016/0291149 A1* | 10/2016 | Zeng | G01S 13/874 |
| 2020/0217925 A1* | 7/2020 | Kim | G01S 13/53 |
| 2020/0278440 A1* | 9/2020 | Wang | G01S 13/584 |
| 2021/0055399 A1* | 2/2021 | Hiramoto | G01S 13/931 |

(Continued)

FOREIGN PATENT DOCUMENTS

| | | |
|---|---|---|
| JP | 2008-286582 A | 11/2008 |
| JP | 2016-217992 A | 12/2016 |

(Continued)

OTHER PUBLICATIONS

Notice of Allowance mailed on Dec. 4, 2024 from the Korean Patent Office for Korean Application No. 10-2021-0092279.

*Primary Examiner* — Ladimir Magloire
*Assistant Examiner* — Noah Yi Min Zhu
(74) *Attorney, Agent, or Firm* — Insight Law Group, PLLC; Seung Lee

(57) ABSTRACT

In an apparatus for detecting a target using a radar according to one aspect of the present invention, a first radar and a second radar, which are multi-channel radars each including a plurality of transmitting antennas and a plurality of receiving antennas, are installed to be spaced apart from each other, and position information of a target and velocity vector information of the target are calculated from first position information and first velocity information of the target acquired from the first radar and second position information and second velocity information of the target acquired from the second radar and then are used to detect and track the target.

20 Claims, 8 Drawing Sheets

(56) References Cited

U.S. PATENT DOCUMENTS

2022/0146676 A1\* 5/2022 Armstrong-Crews .................... G01S 17/34
2022/0227396 A1\* 7/2022 Tsuchida ................ G01C 21/28

FOREIGN PATENT DOCUMENTS

| JP | 2019-184438 A | 10/2019 |
| JP | 2021-32640 A | 3/2021 |
| KR | 10-2017-0070391 A | 6/2017 |
| KR | 10-2019-0081257 A | 7/2019 |
| KR | 10-2021-0032283 A | 3/2021 |

\* cited by examiner

→ ACTUAL VELOCITY VECTOR (VECTOR 3)
—·—▶ DOPPLER VELOCITY VECTOR (VECTOR 1) CALCULATED BY FIRST RADAR
—··—▶ DOPPLER VELOCITY VECTOR (VECTOR 2) CALCULATED BY SECOND RADAR

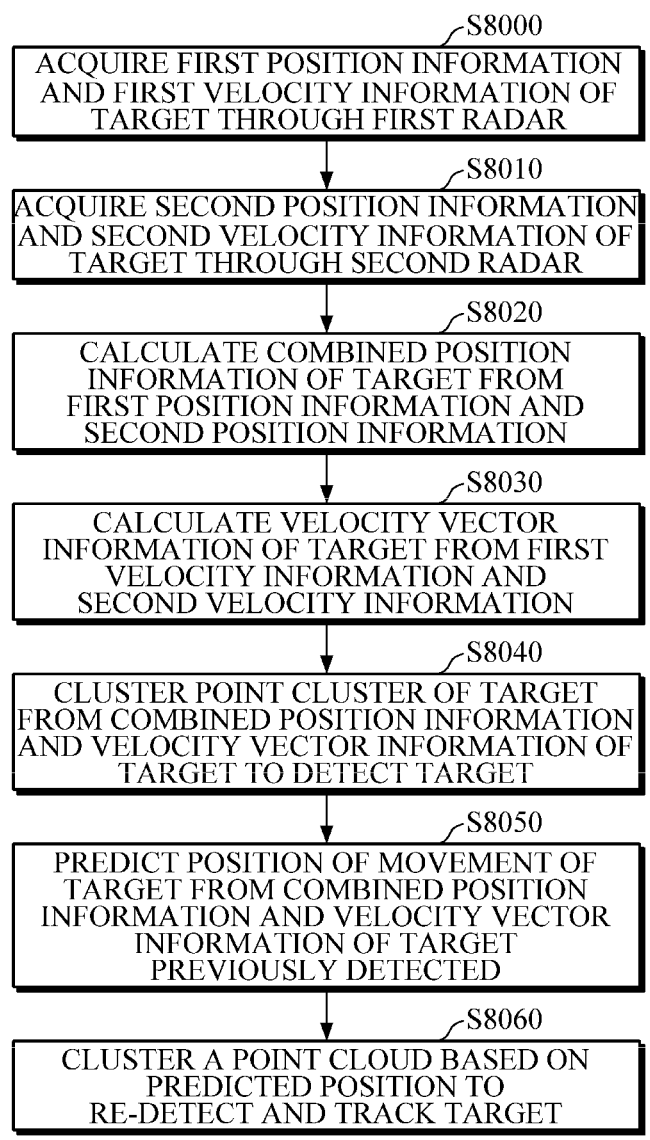

APPARATUS AND METHOD FOR DETECTING TARGET USING RADAR

CROSS-REFERENCE TO RELATED APPLICATION(S)

This application claims priority from Korean Patent Application No. 10-2021-0092279, filed on Jul. 14, 2021, in the Korean Intellectual Property Office, the disclosure of which is incorporated herein by reference in its entirety.

BACKGROUND

1. Field

The following description relates to technology for detecting a moving target using a radar, and more particularly, to an apparatus and a method for detecting a moving target using two or more multi-channel radars.

2. Description of Related Art

Radars have been developed for military purposes, but in recent years, a utilization range thereof is expanding for the purpose of detecting a target in various fields.

In particular, vehicle radars are widely used in driver safety systems, autonomous driving, and the like. Vehicle radars mainly use a 77-GHz frequency modulated continuous wave (FMCW) method to measure a delay time according to a distance with a frequency difference between a linearly frequency-modulated signal and a signal reflected when the linearly frequency-modulated signal is transmitted and then reflected by a target, that is, with a beat frequency.

Radars generally may detect a target as a single point due to low angle detection performance thereof, but multi-channel radars including image radars may detect a target as a point cloud by increasing the number of transmitting and receiving antennas.

However, in such a multi-channel radar, when a size of a radar device is taken into account, since an interval between antennas is narrow, it is still difficult to track a target moving in a direction horizontal to the radar. That is, in a radar, movement in a direction toward or away from the radar is determined using a Doppler effect, but movement in a direction horizontal to the radar is determined through a separate prediction model. In this case, it is possible to predict movement of an object (for example, a vehicle) in a predetermined direction, but it is difficult to predict irregular movement of an object (for example, a person).

RELATED ART DOCUMENTS

Patent Documents (Patent Document 001) Korean Patent Publication No. 10-2019-0081257

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The following description relates to an apparatus and a method capable of acquiring velocity information of a target as two-dimensional or more information to increase target detection precision and predicting a movement direction of the target to increase target tracking performance.

In one general aspect, an apparatus for detecting a target using a radar includes a first radar, a second radar, a position information combination unit, and a velocity vector information calculation unit.

The first radar and the second radar may be multi-channel radars each including a plurality of transmitting antennas and a plurality of receiving antennas. The first radar and the second radar may be installed to be spaced apart from each other. The first radar may output first position information and first velocity information of a target, and the second radar may output second position information and second velocity information of the target.

The position information combination unit may calculate combined position information of the target from the first position information and the second position information, and the velocity vector information calculation unit may calculate velocity vector information of the target from the first velocity information and the second velocity information.

In an additional aspect, the apparatus may further include a target detection unit, and the target detection unit may detect the target by clustering a point cloud of the target from the combined position information of the target and the velocity vector information of the target.

In an additional aspect, the apparatus may further include a target tracking unit, and the target tracking unit may track the target from the combined position information of the detected target and the velocity vector information of the target. More specifically, the target tracking unit may predict a position of movement of the target from the combined position information of the target previously detected and the velocity vector information of the target and may cluster a point cloud based on the predicted position to re-detect and track the target.

In various aspects, the first radar and the second radar may be installed to be spaced apart from each other such that a surface on which the first radar is installed and a surface on which the second radar is installed form an inclination angle.

In another aspect, the number of radars used in an apparatus for detecting a target may be increased to N (wherein N is a natural number greater than or equal to three).

In still another aspect, a method of detecting a target of an apparatus for detecting a target includes acquiring first position information and first velocity information of a target through a first radar, acquiring second position information and second velocity information of the target through a second radar installed to be spaced apart from the first radar, calculating combined position information of the target from the first position information and the second position information, and calculating velocity vector information of the target from the first velocity information and the second velocity information, wherein the first radar and the second radar are multi-channel radars each including a plurality of transmitting antennas and a plurality of receiving antennas.

In an additional aspect, the method may further include clustering a point cloud of the target from the combined position information of the target and the velocity vector information of the target to detect the target.

In an additional aspect, the method may further include tracking the target from the combined position information of the detected target and the velocity vector information of the target. Specifically, the tracking of the target may include predicting a position of movement of the target from the combined position information of the target previously detected and the velocity vector information of the target, and clustering a point cloud based on the predicted position to re-detect and track the target.

BRIEF DESCRIPTION OF THE DRAWINGS

FIG. 8 is a flowchart of a method of detecting a target according to one embodiment of the present invention.

DETAILED DESCRIPTION

The above-described aspects and other aspects are embodied through embodiments described below with reference to the accompanying drawings. It will be understood that components of each of the embodiments may be combined in various ways within one embodiment unless otherwise stated or contradicted by one another. Each of blocks in a block diagram may be a representation of a physical part in some cases but may be a logical representation of a portion of a function of one physical part or a function of a plurality of physical parts in other cases. In some cases, the block or an entry of a portion of the block may be a set of program instructions. All or some of the blocks may be implemented as hardware, software, or a combination thereof.

Figure 1:
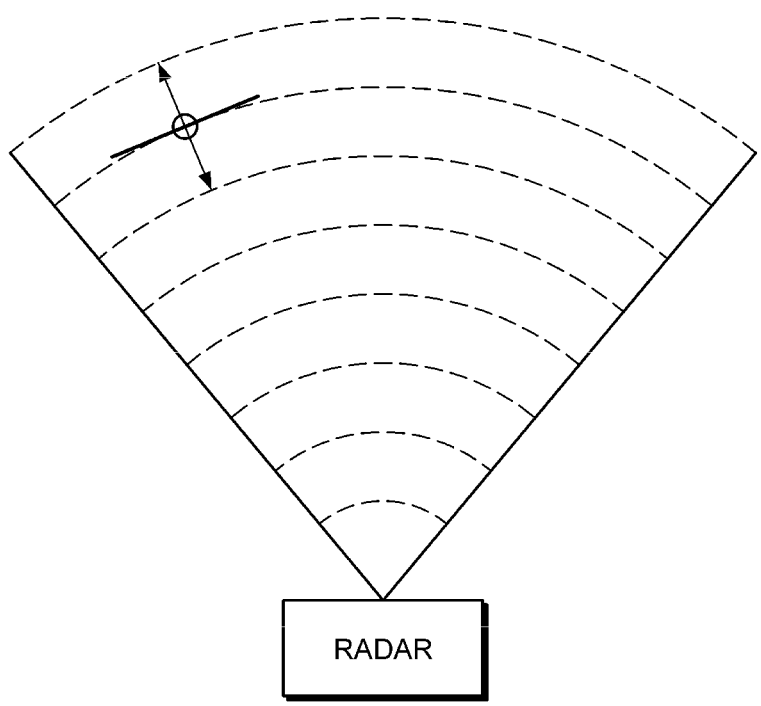
FIG. 1 illustrates an example of a related art in which a Doppler velocity of a target is obtained with a single radar.

FIG. 1 illustrates an example of a related art in which a Doppler velocity of a target is obtained with a single radar. A radar shown in FIG. 1 may process a signal reflected by a target to obtain a position of the target, a Doppler velocity, and the like. Unlike a single channel radar that can only obtain a radial distance to a target, the radar shown in FIG. 1 may have a multi-channel to obtain an angular component and may calculate a position of a target as coordinates on a corresponding radar coordinate system using a distance to the target and the angular component. In addition, the radar shown in FIG. 1 may obtain a Doppler velocity. However, with the radar of FIG. 1, the Doppler velocity is obtained in a direction away from or toward the radar. Accordingly, when the target of FIG. 1 moves while maintaining a distance from the radar, the radar of FIG. 1 does not detect movement of the target well. This is because, even though the radar of FIG. 1 is a multi-channel radar, when a size of a radar device is taken into consideration, an interval between receiving antennas is extremely narrow, and thus directions of Doppler velocities are almost the same for each channel. Therefore, in a method of detecting a target using the single radar of FIG. 1, since the radar can only detect movement in a direction of the radar in relation to target tracking and cannot detect movement in a direction horizontal to the radar, a separate prediction model for horizontal movement should be used to predict movement of a target.

Figure 2:
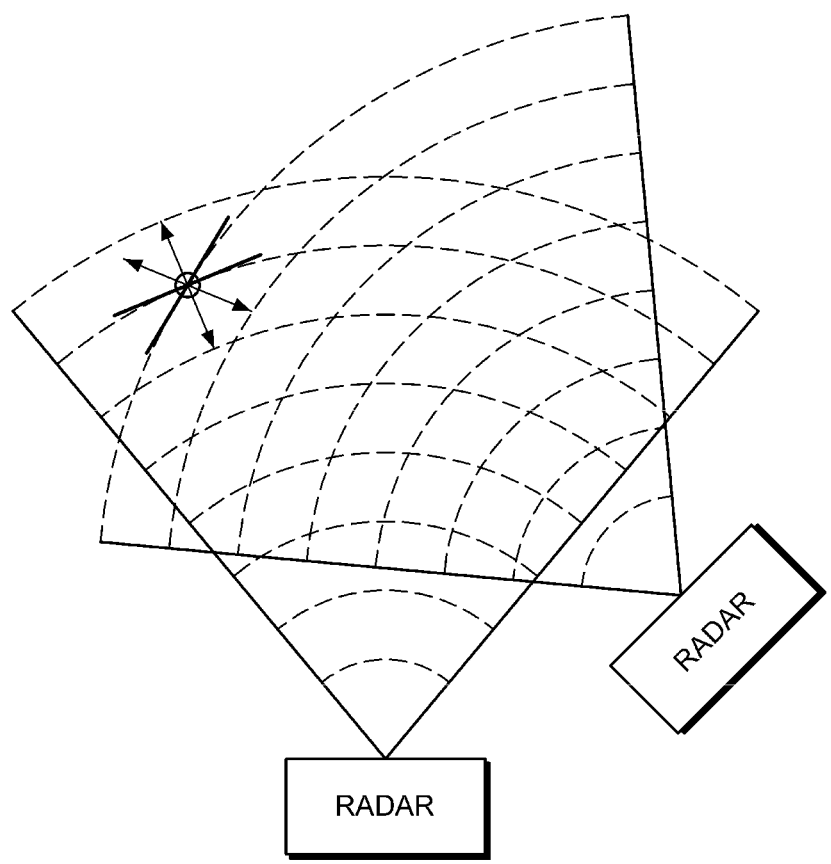
FIG. 2 illustrates an example in which a Doppler velocity of a target is obtained with multiple radars.

FIG. 2 illustrates an example in which a Doppler velocity of a target is obtained with multiple radars. As shown in FIG. 2, by using two radars, movement of a target may be accurately predicted using a Doppler velocity of the target obtained by each radar. That is, a Doppler velocity of a target in a direction of a first radar may be obtained through the first radar, a Doppler velocity of the target in a direction of the second radar may be obtained through the second radar, and then, a velocity vector of the target may be obtained using the two Doppler velocities. Like that shown in FIG. 1, the first radar and the second radar shown in FIG. 2 are also multi-channel radars. Unlike the example of FIG. 1, after a measurement value through the second radar is transformed to a second radar coordinate system, movement of the target in a direction parallel to the first radar can be accurately detected based on the first radar. In addition, when a method of FIG. 2 is used, it is possible to detect movement of a target of which a direction is changed irregularly.

Therefore, since a method of a detecting a target using the multiple radars as shown in FIG. 2 can also detect movement in a direction horizontal to a radar in relation to target tracking, in order to predict movement of a target, there is no need to use a separate prediction model for horizontal movement.

Figure 3:
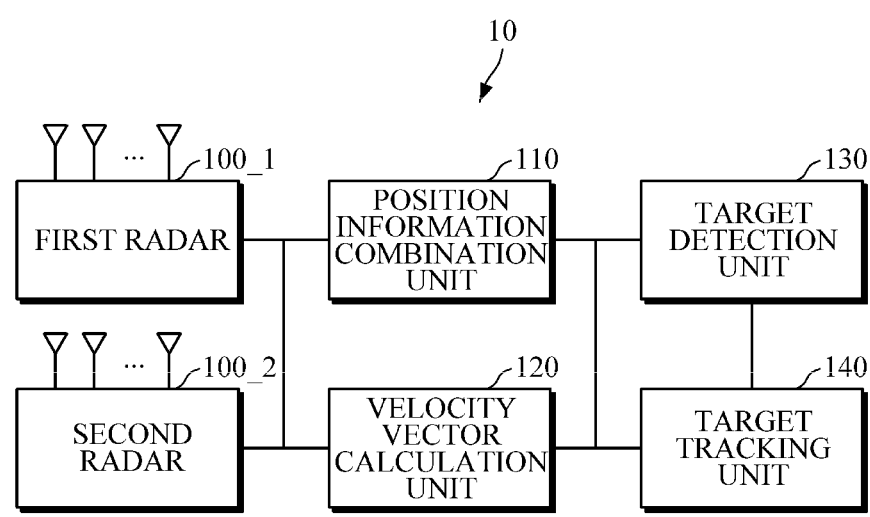
FIG. 3 is a block diagram of an apparatus for detecting a target according to the present invention.

FIG. 3 is a block diagram of an apparatus for detecting a target according to the present invention. As shown in FIG. 3, an apparatus 10 for detecting a target using a radar according to an aspect of the present invention includes a first radar 100_1, a second radar 100_2, a position information combination unit 110, and a velocity vector information calculation unit 120.

The first radar 100_1 is a multi-channel radar including a plurality of transmitting antennas and a plurality of receiving antennas. The first radar 100_1 may be a frequency modulated continuous wave (FMCW) radar.

The FMCW radar calculates a distance to a target and a Doppler velocity of the target from a beat frequency obtained from a transmission signal transmitted by being linearly frequency-modulated and a reception signal received when the transmission signal is reflected by the target.

Figure 4:
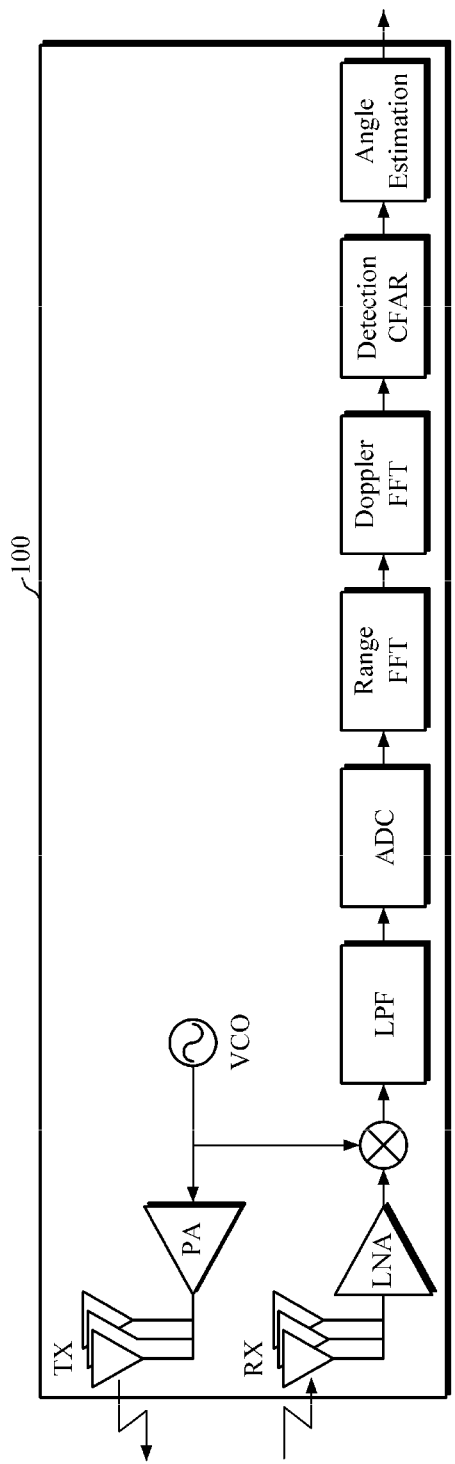
FIG. 4 is a block diagram of a frequency modulated continuous wave (FMCW) radar usable in an apparatus for detecting a target according to the present invention.

FIG. 4 is a block diagram of an FMCW radar usable in an apparatus for detecting a target according to the present invention. The block diagram shown in FIG. 4 is a block diagram of a general FMCW radar, and each component will be briefly described. A voltage-controlled oscillator (VCO) generates and outputs an oscillation signal of which a frequency is linearly modulated, and a power amplifier PA amplifies a signal excluding noise and then transmits a radar signal through a transmitting antenna. Then, a low-noise amplifier LNA amplifies a signal received through a receiving antenna, and a frequency mixer mixes the amplified signal with an output signal of the VCO to generate a mixed signal that is to be used to generate a beat frequency signal. A low-pass filter (LPF) filters only a signal in a low frequency band of a signal output from the frequency mixer and removes noise of a high-frequency component thereof, and then, an analog-to-digital converter (ADC) converts the signal in the low frequency band into a digital signal. The converted digital signal is subjected to a first range fast Fourier transform (FFT) (range FFT), a second FFT (Doppler FFT), constant false alarm rate (CFAR) detection, and an angle component calculation (angle estimation) to calculate a distance, a velocity, and an angle of a target. A radar output of FIG. 4 may be a set of distances, velocities, and angles of point clouds detected as a target or a set of coordinates (coordinates on a radar coordinate system) and velocities of the point clouds.

The first radar 100_1 processes a received signal and outputs first position information and first velocity information of a target. In this case, the first position information is a set of distances and angles of points detected as a target or a set of coordinates (coordinates on a radar coordinate system) of the points. The first velocity information is a set of Doppler velocities of points detected as a target.

Although a case in which the first radar 100_1 is the FMCW radar has been described, the present invention is not limited thereto, and the first radar 100_1 may be another type of radar.

The second radar 100_2 is also a multi-channel radar including a plurality of transmitting antennas and a plurality of receiving antennas. The second radar 100_2 may be an FMCW radar. However, the present invention is not limited thereto, and the second radar 100_2 may be another type of radar. The second radar 100_2 is installed to be spaced apart from the first radar 100_1 by a predetermined distance. The second radar 100_2 may be installed to be spaced apart from the first radar 100_1 by 50 cm or more.

In this case, the first radar 100_1 and the second radar 100_2 may be installed such that a surface on which the first radar 100_1 is installed and a surface on which the second radar 100_2 is installed form a predetermined inclination angle of θ. For the purpose of increasing a direction deviation between a Doppler velocity of a target obtained through the first radar 100_1 and a Doppler velocity obtained through the second radar 100_2, the first radar 100_1 and the second radar 100_2 may be installed to be spaced apart from each other so as to form an inclination angle.

The second radar 100_2 processes a received signal to output second position information and second velocity information of a target. The second position information is also a set of distances and angles of points detected as a target or a set of coordinates (coordinates on a radar coordinate system) of the points. The second velocity information is also a set of Doppler velocities of points detected as a target.

The first radar 100_1 and the second radar 100_2 are multi-channel radars and detect one target as a plurality of points, that is, a point cloud. Since a target is generally an object having volume, the first radar 100_1 and the second radar 100_2 detect the same target as different point clouds due to a difference in installation positions thereof.

Figure 5:
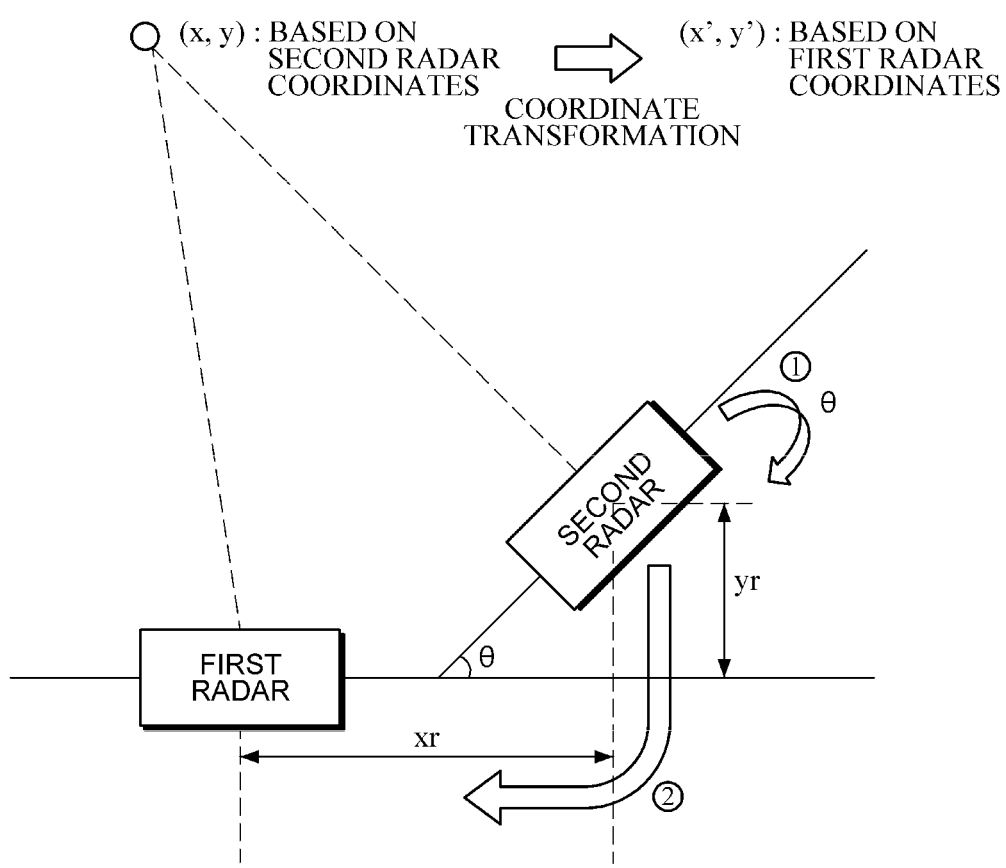
FIG. 5 illustrates a concept in which a second radar coordinate system is transformed into a first radar coordinate system.

The position information combination unit 110 calculates combined position information of the target from the first position information and the second position information. The first position information is position information acquired by the first radar 100_1 and is position information on a first radar coordinate system. The second position information is position information acquired by the second radar 100_2 and is position information on a second radar coordinate system. Since the first position information and the second position information have different coordinate systems, a point cloud cannot be created by simply combining two pieces of position information. FIG. 5 is a diagram illustrating a concept in which the second radar coordinate system is transformed into the first radar coordinate system. As shown in FIG. 5, the first radar 100_1 and the second radar 100_2 form an inclination angle of θ between installation surfaces thereof and are spaced apart from each other by xr along a horizontal axis and yr along a vertical axis. In the example of FIG. 5, the position information combination unit 110 rotates and transforms position information (x, y) acquired through the second radar 100_2 by θ (①) and shifts and transforms the position information (x, y) in consideration of xr and yr which are distance differences between radar centers. That is, a target point at a position (x, y) based on second radar coordinates is reversely rotated by an angle between the two radars and transformed to obtained coordinates (xθ, yθ) (xθ=x sin θ+y cos θ, and yθ=x cos θ−y sin θ) and then obtain shifted and transformed coordinates (x', y') (x'=xr−xθ, and y'=yθ−yr). A target detected by the second radar 100_2 may be transformed to the first radar coordinate system, and a corresponding point may be a point detected by the first radar 100_1 or a point not detected by the first radar 100_1.

When the first position information and the second position information are combined by the position information combination unit 110, a point for a target detected by the second radar 100_2 is transformed to the first radar coordinate system and then is combined with a point for a target detected by the first radar 100_1, thereby generating a point cloud. A point cloud generated by combining two coordinate systems may be a set of a target point detected by the first radar 100_1 and a target point detected by the second radar 100_2, and some points may be points detected by both of two radars.

In the above-described example, coordinates are transformed to the first radar coordinate system, but of course, it is also possible to transform coordinates based on the second radar coordinate system.

Figure 6:
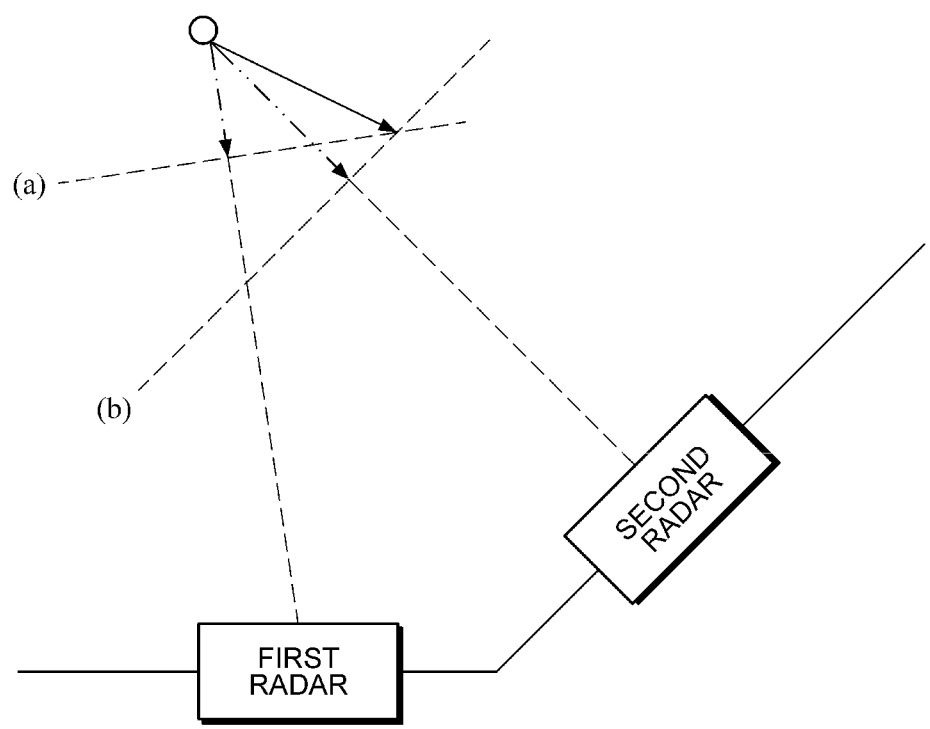
FIG. 6 illustrates a velocity vector of a target being calculated using a Doppler velocity detected by a first radar and a Doppler velocity detected by a second radar.

The velocity vector information calculation unit 120 calculates velocity vector information of the target from the first velocity information and the second velocity information. The first velocity information is a Doppler velocity of the target detected by the first radar 100_1, that is, a Doppler velocity in a direction toward or away from the first radar 100_1, and is Doppler velocity information on the first radar coordinate system. The second velocity information is a Doppler velocity of the target detected by the second radar 100_2, that is, a Doppler velocity in a direction toward or away from the second radar 100_2, and is Doppler velocity information on the second radar coordination system. Movement of the target may be predicted using the first velocity information and the second velocity information. In this case, the second velocity information may be utilized by being transformed to the first coordinate system. FIG. 6 illustrates a velocity vector of a target being calculated using a Doppler velocity detected by the first radar 100_1 and a Doppler velocity detected by the second radar 100_2. As shown in FIG. 6, an actual velocity vector (vector 3) of a target is calculated as a Doppler velocity vector (vector 1) directed to the first radar 100_1 by the first radar 100_1. In this case, since all vectors reaching a point on a straight line a from the target are calculated as the Doppler velocity vector (vector 1) directed to the first radar 100_1 by the first radar 100_1, an actual velocity of the target cannot be known only by the Doppler velocity calculated by the first radar 100_1. In addition, the actual velocity vector (vector 3) of the target may be calculated as a Doppler velocity vector (vector 2) directed to the second radar 100_2 by the second radar 100_2, and all vectors reaching a point on a straight line b from the target may be calculated as the Doppler velocity vector (vector 2) directed to the second radar 100_2 by the second radar 100_2. Accordingly, inversely, for the target, the actual velocity vector (vector 3) can be obtained from the Doppler velocity (vector 1) calculated by the first radar 100_1 and the Doppler velocity (vector 2) calculated by the second radar 100_2.

According to an additional aspect of the present invention, the apparatus 10 for detecting a target may further include a target detection unit 130.

The target detection unit 130 may detect a target by clustering a point cloud of the target from combined position information of the target and velocity vector information of the target. The target detection unit 130 clusters points detected by the first radar 100_1 into groups of adjacent points and clusters points detected by the second radar 100_2 into groups of adjacent points. The position information combination unit 110 may transform a target position of the second radar 100_2 based on the first radar coordinate system to cluster points again on the first radar coordinate system. However, according to aspects of the present invention, a point cloud may be generated by first performing a coordinate transformation and then clustering points on the first radar coordinate system. In this case, as a clustering algorithm, a density based spatial clustering of application with a noise (DBSCAN) algorithm for calculating a Euclidean distance of adjacent points may be used, or other clustering algorithms may be used. In addition, the target detection unit 130 may accurately detect a target using velocity vector information of points calculated by the velocity vector information calculation unit 120. For example, since two point clouds are adjacent, even when the two point clouds are detected as one point cloud in an Euclidean distance or the like (when two targets are actually adjacent), points clouds may be separated again into groups of points with pieces of velocity vector information of points which are the same or similar to each other.

In addition, the target detection unit 130 may detect a continuously tracked point cloud as an accurate target. That is, the target detection unit 130 may continuously track and remove a ghost target that appears temporarily and disappears.

According to an additional aspect of the present invention, the apparatus 10 for detecting a target may further include a target tracking unit 140.

The target tracking unit 140 may track a target from combined position information of the detected target and velocity vector information of the target. The target tracking unit 140 may register a point cloud detected by the target detection unit 130 in a target candidate group and then may track the corresponding point cloud. The target tracking unit 140 may predict a next position of the target using the combined position information of the target and the velocity vector information of the target.

More specifically, the target tracking unit 140 may predict a position of movement of the target from the combined position information of the target detected in a previous frame and the velocity vector information of the target. The target tracking unit 140 may re-detect and track the target by clustering a point cloud of the target calculated from a currently input radar signal based on the predicted position. That is, the target tracking unit 140 re-detects the target by combining point clouds again using an algorithm such as a DBSCAN algorithm for points around the predicted position. Such a process is repeated until the target deviates from a designated region of interest (ROI).

Figure 7:
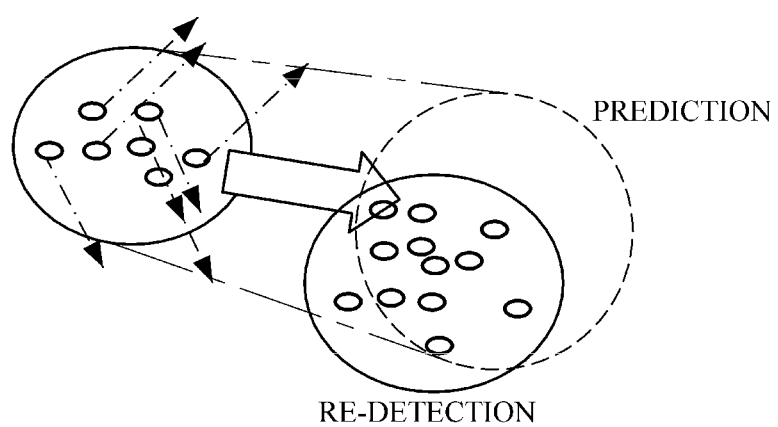
FIG. 7 illustrates a concept in which a position of a target is predicted and the target is re-detected based on the predicted position.

FIG. 7 illustrates a concept in which a position of a target is predicted and the target is re-detected based on the predicted position. As shown in FIG. 7, a position of a target is predicted using a velocity vector of the target from a previously detected position of the target, and the target is re-detected by performing clustering again based on the predicted position.

According to another aspect of the present invention, the number of radars used in the apparatus 10 for detecting a target may be increased to N (wherein N is a natural number greater than or equal to three). That is, the apparatus 10 for detecting a target may include N radars (wherein N is a natural number greater than or equal to three), and all of the radars may be multi-channel radars each including a plurality of transmitting antennas and a plurality of receiving antennas. In addition, the N radars (wherein N is a natural number greater than or equal to three) may be installed to be spaced apart from each other to output position information and velocity information of a target.

A position information combination unit 110 of the present aspect may calculate combined position information of a target from pieces of position information output by respective radars. A coordinate system of one radar may be set as a common coordinate system, and a separate global coordinate system may also be used as a common coordinate system.

A velocity vector information calculation unit 120 of the present aspect may calculate velocity vector information of the target from pieces of velocity information output by the respective radars.

A method of detecting a target according to one embodiment of an apparatus 10 for detecting a target of the present invention includes an operation of acquiring first position information and first velocity information of a target through a first radar 100_1, an operation of acquiring second position information and second velocity information of the target through a second radar 100_2 installed to be spaced apart from the first radar 100_1, an operation of calculating combined position information of the target from the first position information and the second position information, and an operation of calculating velocity vector information of the target from the first velocity information and the second velocity information. The first radar 100_1 and the second radar 100_2 may be multi-channel radars each including a plurality of transmitting antennas and a plurality of receiving antennas and may be FMCW radars.

The operation of acquiring the first position information and the first velocity information is an operation of processing a signal received through the first radar 100_1 and outputting the first position information and the first velocity information of the target. In this case, the first position information is a set of distances and angles of points detected as the target or a set of coordinates (coordinates on a radar coordinate system) of the points. The first velocity information is a set of Doppler velocities of points detected as the target.

The operation of acquiring the second position information and the second velocity information is an operation of outputting the second position information and the second velocity information through the second radar 100_2 installed to be spaced apart from the first radar 100_1. The second position information is also a set of distances and angles of points detected as the target or a set of coordinates (coordinates on a radar coordinate system) of the points. The second velocity information is also a set of Doppler velocities of points detected as the target.

The first radar 100_1 and the second radar 100_2 are multi-channel radars and detect one target as a plurality of points, that is, a point cloud. Since a target is generally an object having volume, the first radar 100_1 and the second radar 100_2 detect the same target as different point clouds due to a difference in installation positions thereof.

The operation of calculating the combined position information of the target is an operation of calculating the combined position information of the target from the first position information and the second position information. The first position information is position information acquired by the first radar 100_1 and is position information on a first radar coordinate system, and the second position information is position information acquired by the second radar 100_2 and is position information on a second radar coordinate system. Since the first position information and the second position information have different coordinate systems, a point cloud cannot be created by simply combining two pieces of position information. FIG. 15 illustrates a concept in which the second radar coordinate system is transformed into the first radar coordinate system, and a description of FIG. 5 is the same as that described above.

When the first position information and the second position information are combined through the operation of calculating the combined position information of the target, a point for the target detected by the second radar 100_2 is transformed to the first radar coordinate system and then is combined with a point for the target detected by the first radar 100_1, thereby generating a point cloud. A point cloud generated by combining two coordinate systems may be a set of a target point detected by the first radar 100_1 and a target point detected by the second radar 100_2, and some points may be points detected by both of two radars.

The operation of calculating the velocity vector information of the target is an operation of calculating the velocity vector information of the target from the first velocity information and the second velocity information. The first velocity information is a Doppler velocity of the target detected by the first radar 100_1, that is, a Doppler velocity in a direction toward or away from the first radar 100_1, and is Doppler velocity information on the first radar coordinate system. The second velocity information is a Doppler velocity of the target detected by the second radar 100_2, that is, a Doppler velocity in a direction toward or away from the second radar 100_2, and is Doppler velocity information on the second radar coordination system. Movement of the target may be predicted using the first velocity information and the second velocity information. In this case, the second velocity information may be utilized by being transformed to the first coordinate system. FIG. 6 illustrates a velocity vector of the target being calculated using the Doppler velocity detected by the first radar 100_1 and the Doppler velocity detected by the second radar 100_2, and a description of FIG. 6 is the same as that described above.

The method of detecting a target according to the present invention may further include an operation of clustering a point cloud of the target from the combined position information of the target and the velocity vector information of the target to detect the target.

The operation of detecting the target is an operation of clustering the point cloud of the target from the combined position information of the target and the velocity vector information of the target to detect the target. In the operation of detecting the target, points detected by the first radar 100_1 are clustered into groups of adjacent points, and points detected by the second radar 100_2 are clustered into groups of adjacent points. In the operation of detecting the target, a target position of the second radar 100_2 may be transformed based on the first radar coordinate system in the operation of calculating the combined position information of the target, and points may be clustered again on the first radar coordinate system. However, according to aspects of the present invention, a point cloud may be generated by first performing a coordinate transformation and then clustering points on the first radar coordinate system. In this case, as a clustering algorithm, a DBSCAN algorithm for calculating a Euclidean distance of adjacent points may be used, or other clustering algorithms may be used. In addition, in the operation of detecting the target, the target may be accurately detected using velocity vector information of points calculated through an operation of calculating a velocity vector of the target. For example, since two point clouds are adjacent, even when the two point clouds are detected as one point cloud in an Euclidean distance or the like (when two targets are actually adjacent), points clouds may be separated again into groups of points with pieces of velocity vector information of points which are the same or similar to each other.

In addition, in the operation of detecting the target, a continuously tracked point cloud may be detected as an accurate target. That is, in the operation of detecting the target, it is possible to continuously track and remove a ghost target that appears and disappears temporarily.

The method of detecting a target of the present invention may further include tracking the target from the combined position information of the target additionally detected and target velocity vector information of the target.

The operation of tracking the target is an operation of tracking the target from the combined position information of the detected target and the velocity vector information of the target. In the operation of the tracking the target, a point cloud detected in the operation of detecting the target may be registered in a target candidate group, and then, the corresponding point cloud may be tracked. In the operation of tracking the target, a next position of the target may be predicted using the combined position information of the target and the velocity vector information of the target.

Specifically, the operation of tracking the target may include an operation of predicting a position of movement of the target from the combined position information of the target previously detected and the velocity vector information of the target and an operation of clustering a point cloud based on the predicted position to re-detect and track the target. In the operation of tracking the target, for points around the predicted position, point clouds are combined again using an algorithm such as a DBSCAN algorithm to re-detect the target. Such a process is repeated until the target deviates from a ROI.

FIG. 8 is a flowchart of a method of detecting a target according to one embodiment of the present invention. Referring to FIG. 8, an apparatus for detecting a target acquires first position information and first velocity information of a target through a first radar 100_1 (S8000) and acquires second position information and second velocity information of the target through a second radar 100_2 installed to be spaced apart from the first radar 100_1 (S8010). The apparatus 10 for detecting a target calculates combined position information of the target based on a first radar coordinate system from the first position information and the second position information (S8020) and calculates velocity vector information of the target from the first velocity information and the second velocity information (S8030). The apparatus 10 for detecting a target clusters a point cloud of the target from the combined position information and the velocity vector information of the target to detect the target (S8040), predicts next position of movement of the target using the combined position information and the velocity vector information of the target previously detected (S8050), and then clusters a point again based on the predicted position to re-detect and track the target (S8060). The tracking of the target is repeated until the target deviates from a ROI.

According to the present invention, velocity information of a target can be acquired as two-dimensional or more information to increase target detection precision, and a movement direction of the target can be predicted to increase target tracking performance.

Although the present invention has been described above using embodiments with reference to the accompanying drawings, the present invention is not limited thereto. The present invention should be interpreted as including various modified embodiments that may be evidently derived from the above embodiments by one of ordinary skill in the art. The claims below are intended to include such modified embodiments.

What is claimed is:

1. An apparatus for detecting a target using a radar, the apparatus comprising:
    a first radar which is a multi-channel radar including a plurality of transmitting antennas and a plurality of receiving antennas and outputs first position information and first velocity information of a target;
    a second radar which is a multi-channel radar including a plurality of transmitting antennas and a plurality of receiving antennas, is installed to be spaced apart from the first radar, and outputs second position information and second velocity information of the target;
    a memory; and
    a processor which is configured, when executing program instructions stored in the memory, to perform:
        a position information combination operation to calculate combined position information of the target from the first position information and the second position information; and
        a velocity vector information calculation operation to calculate velocity vector information of the target from the first velocity information and the second velocity information,
    wherein the first radar and the second radar are installed to be spaced apart from each other such that a surface on which the first radar is installed and a surface on which the second radar is installed form an inclination angle, and
    wherein the position information combination operation rotates and transforms the second position information acquired through the second radar by the inclination angle and shifts and transforms the second position information vertically and horizontally by the distance difference between the centers of the first and second radars, and then combines the second position information with the first position information.

2. The apparatus of claim 1, wherein the processor is further configured to perform a target detection operation to detect the target by clustering a point cloud of the target from the combined position information of the target and the velocity vector information of the target.

3. The apparatus of claim 2, wherein the processor is further configured to perform a target tracking operation to track the target from the combined position information of the detected target and the velocity vector information of the target.

4. The apparatus of claim 3, wherein the target tracking operation predicts a position of movement of the target from the combined position information of the target previously detected and the velocity vector information of the target and clusters a point cloud based on the predicted position to re-detect and track the target.

5. An apparatus for detecting a target using a radar, the apparatus comprising:
    N radars, including a first radar and a second radar, which are multi-channel radars each including a plurality of transmitting antennas and a plurality of receiving antennas, are installed to be spaced apart from each other, and output pieces of position information and pieces of velocity information of a target, wherein N is a natural number greater than or equal to three;
    a memory; and
    a processor which is configured, when executing program instructions stored in the memory, to perform:
        a position information combination operation to calculate combined position information of the target from the pieces of position information output from the radars; and
        a velocity vector information calculation operation to calculate velocity vector information of the target from the pieces of velocity information output by the radars,
    wherein the first radar and the second radar are installed to be spaced apart from each other such that a surface on which the first radar is installed and a surface on which the second radar is installed form an inclination angle, and
    wherein the position information combination operation rotates and transforms the second position information acquired through the second radar by the inclination angle and shifts and transforms the second position information vertically and horizontally by the distance difference between the centers of the first and second radars, and then combines the second position information with the first position information.

6. A method of detecting a target using a radar, which is a method in which a target is detected by an apparatus for detecting a target using a multi-channel radar including a plurality of transmitting antennas and a plurality of receiving antennas, the method comprising:
    acquiring first position information and first velocity information of a target through a first radar;
    acquiring second position information and second velocity information of the target through a second radar installed to be spaced apart from the first radar;
    calculating combined position information of the target from the first position information and the second position information; and
    calculating velocity vector information of the target from the first velocity information and the second velocity information,
    wherein the first radar and the second radar are installed to be spaced apart from each other such that a surface on which the first radar is installed and a surface on which the second radar is installed form an inclination angle,
    wherein calculating combined position information of the target comprises:
    rotating and transforming the second position information acquired through the second radar by the inclination angle;
    shifting and transforming the second position information vertically and horizontally by the distance difference between the centers of the first and second radars; and
    combining the second position information with the first position information.

7. The method of claim 6, further comprising clustering a point cloud of the target from the combined position information of the target and the velocity vector information of the target to detect the target.

8. The method of claim 7, further comprising tracking the target from the combined position information of the detected target and the velocity vector information of the target.

9. The method of claim 8, wherein the tracking of the target includes:
   predicting a position of movement of the target from the combined position information of the target previously detected and the velocity vector information of the target; and
   clustering a point cloud based on the predicted position to re-detect and track the target.

10. The method of claim 6, wherein calculating the velocity vector information includes:
    obtaining a first Doppler velocity from the first velocity information;
    obtaining a second Doppler velocity from the second velocity information; and
    calculating the velocity vector information using the first Doppler velocity and the second Doppler velocity.

11. The method of claim 6, further comprising removing a ghost target by continuously tracking point clouds.

12. The method of claim 6, wherein the first radar and the second radar are frequency modulated continuous wave (FMCW) radars.

13. The method of claim 6, wherein the first radar and the second radar are installed to be spaced apart from each other by 50 cm or more.

14. The method of claim 6, wherein the first radar and the second radar detect the target as a point cloud.

15. The method of claim 6, further comprising registering a detected point cloud in a target candidate group before tracking the target.

16. The method of claim 6, wherein tracking the target is repeated until the target deviates from a designated region of interest (ROI).

17. The method of claim 6, wherein clustering the point cloud is performed using a density based spatial clustering of application with noise (DBSCAN) algorithm.

18. The method of claim 6, wherein the first radar and the second radar have different coordinate systems, and wherein calculating the combined position information includes transforming the second position information to a coordinate system of the first radar.

19. The method of claim 6, further comprising identifying the target based on the clustered point cloud projected on a two-dimensional space.

20. The method of claim 6, further comprising predicting a next position of the target using the combined position information and the velocity vector information.

* * * * *